Figure 8:
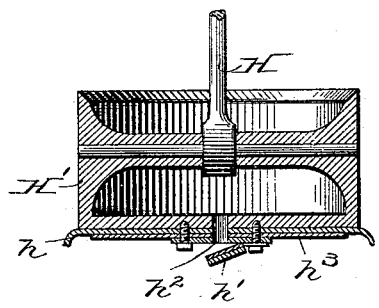

(No Model.) 4 Sheets—Sheet 1.
F. STARR.
HYDRAULIC ENGINE.
No. 546,943. Patented Sept. 24, 1895.
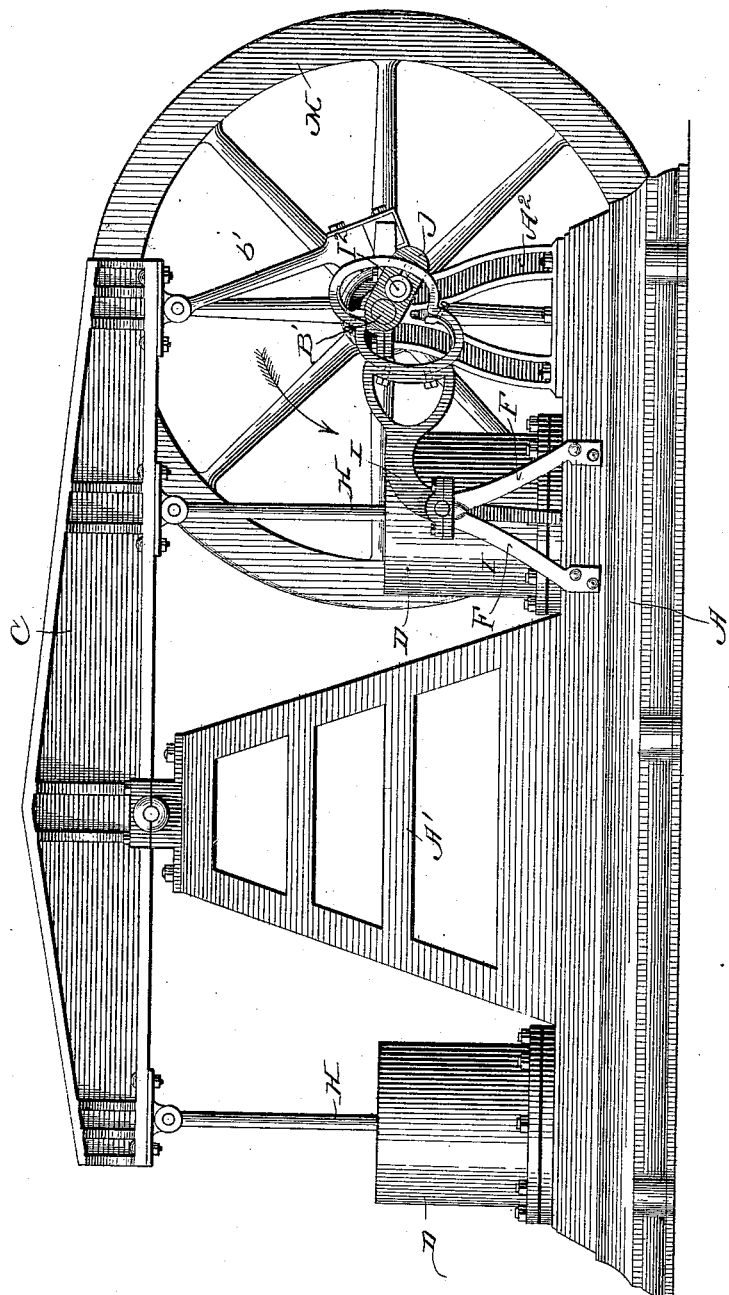

(No Model.) 4 Sheets—Sheet 2.
F. STARR.
HYDRAULIC ENGINE.
No. 546,943. Patented Sept. 24, 1895.
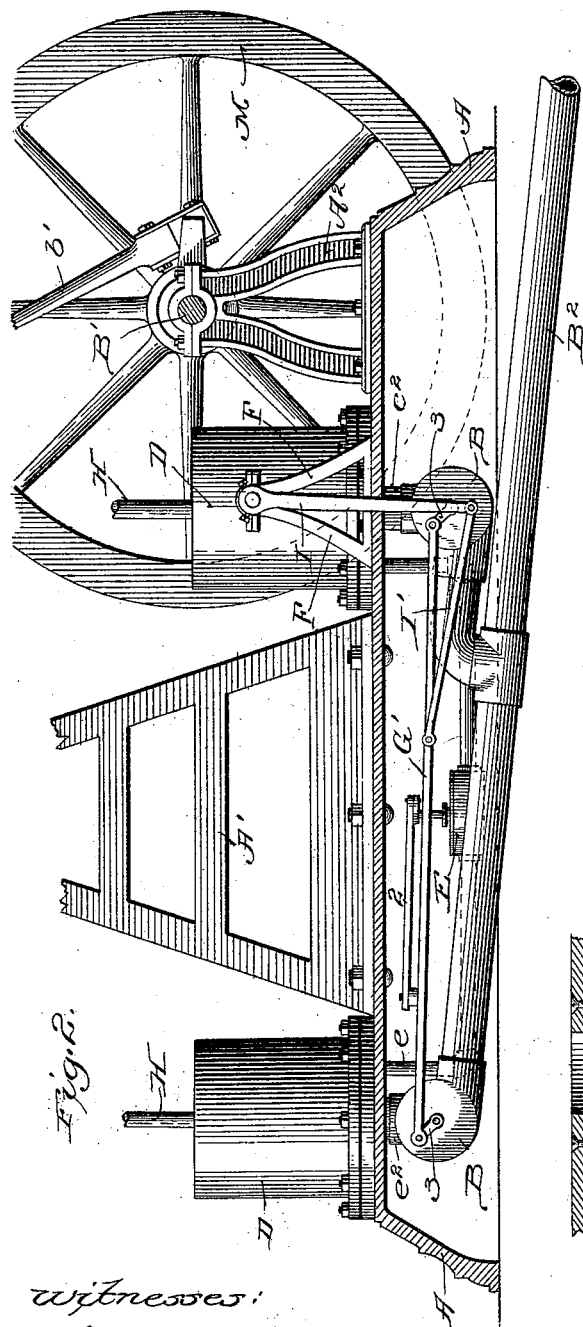
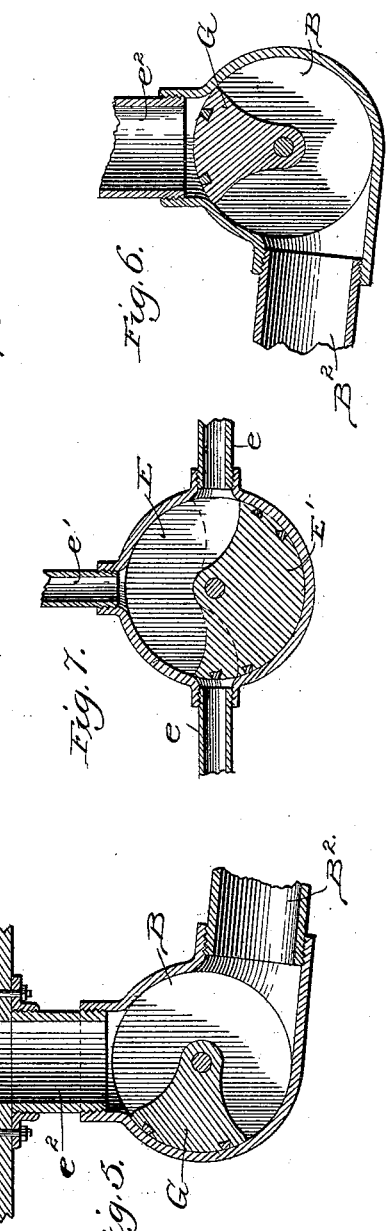
Witnesses:
Harry S. Rohrer
T. H. Libbey
Inventor:
Fred Starr
by Pennie & Goldsborough attys.

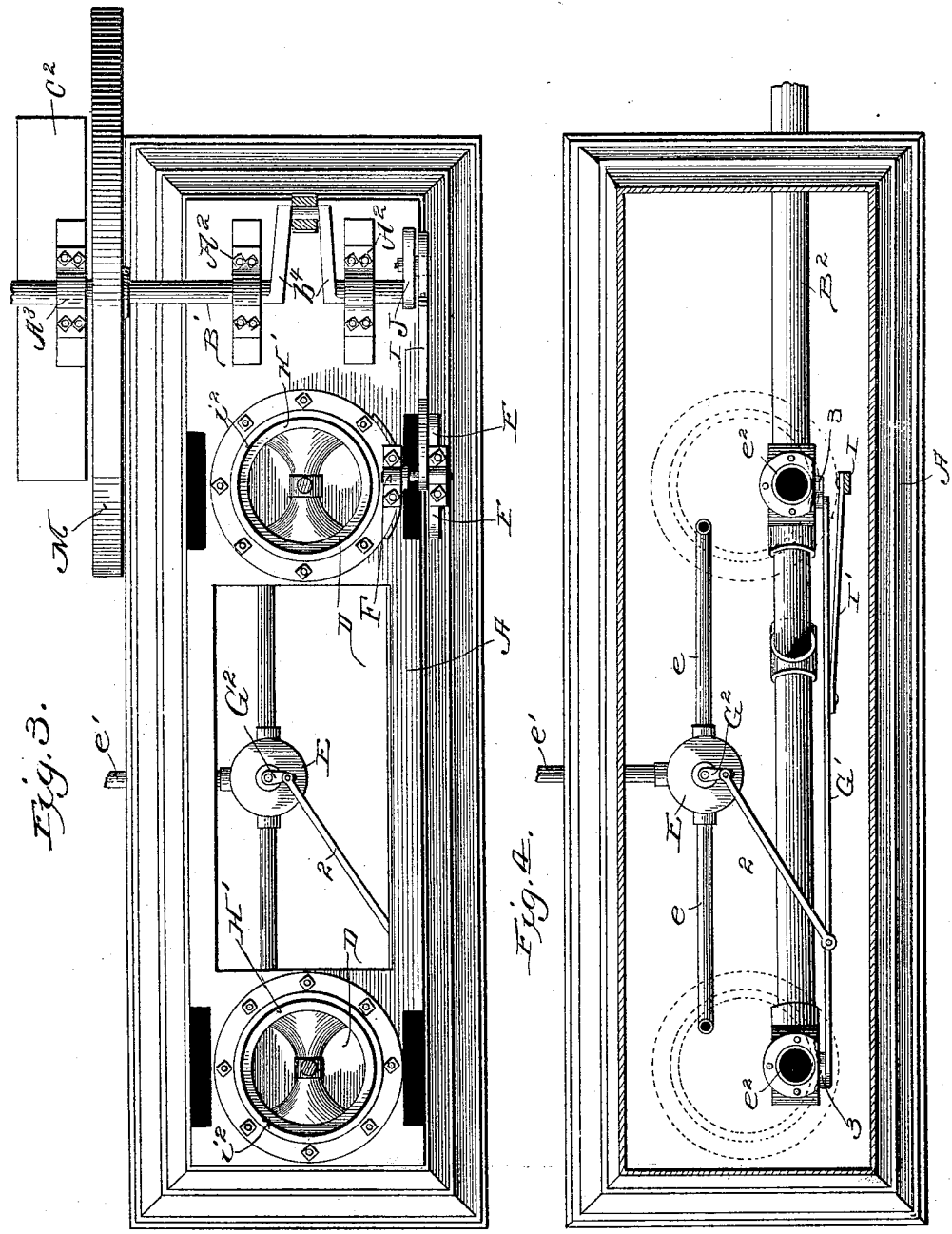

(No Model.)

F. STARR.
HYDRAULIC ENGINE.

No. 546,943. Patented Sept. 24, 1895.

UNITED STATES PATENT OFFICE.

FRED STARR, OF CHICAGO, ILLINOIS.

HYDRAULIC ENGINE.

SPECIFICATION forming part of Letters Patent No. 546,943, dated September 24, 1895.

Application filed June 4, 1895. Serial No. 551,668. (No model.)

*To all whom it may concern:*

Be it known that I, FRED STARR, a citizen of the United States, residing at Chicago, in the county of Cook and State of Illinois, have invented certain new and useful Improvements in Hydraulic Engines; and I do hereby declare the following to be a full, clear, and exact description of the invention, such as will enable others skilled in the art to which it appertains to make and use the same.

Hydraulic engines are not new, but owing to the difficulty encountered in dealing with water under pressure as a motive force such devices have heretofore found very limited application in the mechanic arts, being wholly confined in practice to such light work as running sewing-machines, pumping church organs, &c.

My present invention is distinguished from this class of devices, first, by the fact that it is especially designed and adapted to the heavier kinds of work where large horse-powers are required, and, second, by essential structural differences, which will be hereinafter pointed out; and the invention consists, generally speaking, in a pair of cylinders acting alternately through their pistons upon a walking-beam that is connected to and arranged to drive the main shaft of the engine, each cylinder having suitable inlet and exhaust openings in one end and communicating with a valve-chamber that is common to both, into which valve-chamber water under pressure is received from a source of supply, and from which it is distributed to the cylinders alternately, certain valves being provided to control the inlet and outlet of water to and from the valve-chamber and cylinders without at any time interrupting the continuous flow, the valve in the chamber acting merely to direct or divert the current first into one cylinder and then into the other, but never operating to stop the flow into said chamber.

More particularly the invention consists in the organization and arrangement of parts hereinafter described, and specially pointed out in the claims.

The principles of the invention may be embodied in various specific structures. In fact they have already been worked out by me in different practically-operative forms. I would have it understood, therefore, at the outset, that I do not desire or intend my claims herein to be limited to the details of construction of the several parts going to make up the engine.

Figure 9:
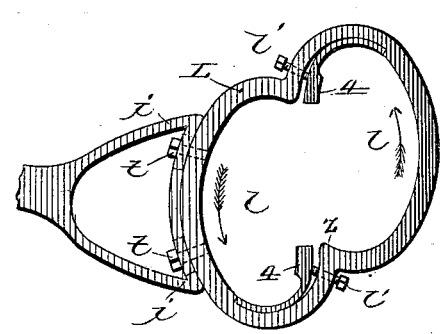
Figure 10:
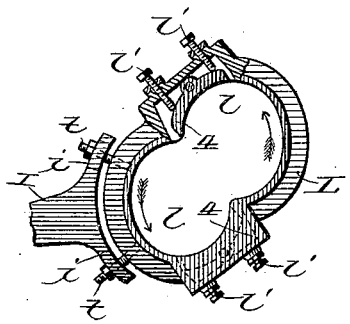
Figure 11:
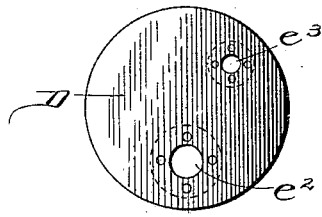

In the accompanying drawings, forming part of this specification, Figure 1 is a side elevation of a complete engine embodying my invention. Fig. 2 is a longitudinal central section of the lower part of the same, the cylinders and valve-operating mechanism being shown in elevation. Fig. 3 is a horizontal section taken just above the tops of the cylinders and the main shaft of the engine. Fig. 4 is a plan view of the valve-operating mechanism and the inlet and outlet pipes and chambers, the top plate of the base-frame being shown as cut away. Figs. 5, 6, and 7 are enlarged detail sectional views of the two-way and exhaust valves and their chambers. Fig. 8 is a central section of the piston-head. Fig. 9 is an enlarged detail of the cam-ring at the end of the bell-crank lever which operates the valve mechanism. Fig. 10 is a modification of the same; and Fig. 11 is a plan of the bottom of one of the cylinders, showing the inlet and exhaust openings.

In the several views like letters and numerals of reference indicate corresponding parts.

Referring to Figs. 1, 2, and 3, A indicates the base-frame, upon which are erected all the working parts of the engine. This frame may be of any preferred shape and construction, and must, of course, be made heavy enough to support all the moving parts. It is preferably made deep enough to permit the valve-chamber pipes and valve-operating mechanism to be located within and protected by the same, and, for convenience of access to the mechanism underneath the same, is preferably cut away at various points in its top plate, as indicated in Fig. 3. It is adapted to be anchored to or upon any suitable foundation, and is preferably constructed in one integral casting. A' A' indicate standards located at opposite sides of the base-frame, preferably a little to one side of the center of its length, and rising to the proper height to support a walking-beam C. $A^2 A^2$ are shorter standards erected at one end of the frame and arranged to support the main shaft B' of the engine at or about the height of the tops of the cylinders. D D are the cylinders and H H are pistons working in the same and connected to the overhead walking-beam. One end of this walking-beam is connected by means of a pitman $b'$ to a crank $b^4$ on the main shaft of the engine, by which means as the walking-beam is oscillated by the pistons H H said shaft is rotated. M indicates a fly-wheel on the main shaft, and outside of this fly-wheel the shaft has a band-wheel, (not shown in the drawings,) by means of which power is taken from the shaft and transmitted where desired. Owing to the weight of the fly and band wheels it is advisable to erect a suitable pedestal $C^2$ at the side of the frame A, and support the outer end of the shaft in an extra standard $A^3$, similar to those on the base-frame. The cylinders and the several standards are herein shown as secured to the top of the base-frame by through-bolts; but they may be secured in any suitable manner.

Referring now more particularly to Fig. 4 and the detail views, E denotes a valve-chamber located centrally between the cylinders D D and communicating by pipes $e\ e$ with inlet-openings $e^3$ in the bottom of each cylinder. The pipes $e\ e$ lead from diametrically-opposite points of the valve-chamber E, and the water from the source of supply enters the valve-chamber through an inlet-pipe $e'$, tapping said chamber at a point intermediate between the pipes $e\ e$. The valve-chamber E is preferably circular in outline, and pivoted centrally within it is a balanced oscillating two-way valve $E'$, the function of which is to divert the continuous flow of water entering the chamber through the open inlet $e'$, first into one cylinder through its pipe $e$, and then into the other through the corresponding pipe leading from the opposite side of the chamber, so as to throw the cylinders into operation alternately. This valve is segmental in form, as indicated in Fig. 7, and its peripheral area is such that when the inlet to one of the cylinders is closed the other is fully open without, however, extending far enough around the interior wall of the chamber to close at any time both the cylinder-inlets. Each of the cylinders D D is provided in its bottom with exhaust-openings $e^2\ e^2$, communicating through suitable pipes and valve-chambers B B with an exhaust-pipe $B^2$, common to both the cylinders. As indicated in Fig. 11, these exhaust-openings are of considerably greater area than the inlets, the object of which is to insure a quick and easy exhaust of water from the cylinders at the moment the pressure is cut off by closing the inlet of water thereto from the valve-chamber E. G G indicate segmental oscillating valves, located in the chambers B B and controlling the exhausts from the cylinders.

The relative arrangement and working of these valves—that is to say, the two-way valve and the two exhaust-valves—are essential to the proper action of the engine and are as follows: The two-way valve in the chamber E is oscillated by mechanism presently to be described, so as to open or close the inlets to the cylinders alternately, the inlet to one cylinder being closed simultaneously with the opening of the inlet to the other cylinder. The exhaust-valves G G are connected together in fixed relative position by means of the connecting-rod $G'$, pivotally secured to the stems 3 3 of said valve. The two-way valve $E'$ has also a fixed position relative to the exhaust-valves G G, being secured by means of the rod 2, which is pivoted to its stem $G^2$, and to the connecting-bar $G'$, so that as the two-way valve is oscillated the exhaust-valves G G are also concurrently worked. In Figs. 5, 6, and 7 the relative positions of the two-way and exhaust valves are shown. When the two-way valve is in position to direct the flow into either cylinder, the exhaust-valve of that cylinder is in the position indicated in Fig. 6, being so geared up and connected to the two-way valve as to close the exhaust immediately before the water enters the cylinder. When the two-way valve is in a position to shut off the pressure from either cylinder, the exhaust-valve of that cylinder is in the position indicated in Fig. 5—that is to say, wide open—its connection with the exhaust-valve of the other cylinder being such that it is opened as the latter is closed, and its connection with the two-way valve being such that the latter closes the opening in the valve-chamber E at the same time the valve G opens the exhaust in the cylinder.

The mechanism for simultaneously operating these valves is as follows: F F indicate short standards rising from the base-frame near the end where the main shaft is journaled and preferably alongside of the cylinder. In bearings at the upper ends of these standards is journaled a bell-crank lever I, one arm of which extends horizontally toward the main shaft $B'$, and the other arm of which extends vertically downward through an opening in the top of the frame. The lower end of this vertical arm of the lever I is connected by a link or pitman $I'$ to the slide-bar or connecting-rod $G'$ of the valve mechanism. At the outer end of the horizontal arm of the lever there is a head or enlargement L, having a loose connection with a crank-arm J on the main shaft $B'$, the connection being such that the lever is oscillated by the crank-arm for the purpose of actuating the valve mechanism. The letters $l\ l$ denote curved or oval-shaped recesses in the enlargement L, said recesses communicating with each other by a free space sufficiently large to permit the roller $I^2$ on the crank-arm J to pass from one of said recesses, in which it travels during one half of the rotation of the arm into the other, where it completes its revolution. The crank-arm travels in the direction of the arrow in Fig. 1 and traverses the recesses $l\ l$ in the direction indicated by the arrows in Figs. 9 and 10. In order to take up wear, as well as to accurately adjust the amount of movement given to the lever I by the crank-arm, pivoted cams 4 4 are let into recesses in the rim of the enlargement L, so that said cam-surfaces form parts of the periphery of the irregular shaped opening $l\ l$. These cams are provided with set-screws tapped into the rim of the head L, by means of which they may be accurately adjusted. The roller $I^2$ on the crank-arm of the main shaft projects into these recesses in the head, and is preferably provided with flanges for preventing it from leaving the track formed by the inner wall of said recesses as the arm rotates. As shown in Figs. 9 and 10, there is one cam for each of the openings $l\ l$, and they are set opposite to each other and at the same point in each opening with respect to the rotation of the crank-arm—that is to say, each cam is located at the end of its opening, and so that the roller on the crank-arm will strike it just before it leaves one of the openings and passes into the other. Assuming the roller to be at the point $z$ and the crank-arm to be rotated in the direction of the arrows, it will travel around the opening $l$ without affecting the position of the arm of the bell-crank lever until it comes in contact with the cam-surface 4, when the arm of the bell-crank lever will be caused to rise suddenly. This movement, through the intermediacy of the vertical arm of the lever, the pitman I', and the connecting-rods G' and 2 of the valve mechanism, causes the simultaneous shifting of the valves, so as to throw one cylinder into operation and the other out. When, in the continued rotation of the arm J, the roller leaves the point of the cam 4, it passes into the other recess $l$ and travels around in it without affecting the position of the bell-crank lever until it comes in contact with the other cam, when the position of the lever is suddenly depressed, thus reversing the valves and throwing the cylinder which was inoperative while the roller traveled in the other recess into action. While the roller is traveling from one cam to the other around the openings $l$, the bell-crank lever will remain stationary; but when the roller strikes either of the cams it will be shifted by a sudden impulse and instantly change the positions of the valves.

In Fig. 10 the construction of the cams 4 4 is slightly different from that in Fig. 9, in that they are pivoted centrally of their length and provided with two set-screws $l'\ l'$, one acting upon each end of the cams, instead of as in Fig. 9, where each cam is pivoted at its end and provided with a single set-screw $l'$. The construction shown in Fig. 9 is preferred in practice, being simpler and stronger; but the other may be employed whenever preferred. It is to be noted in connection with these openings that the cams 4 4 are made adjustable merely for the purpose of taking up wear and adjusting the throw of the bell-crank lever. Where it is not desired to have such adjustment, or where any other adjustment is employed, the cams may be integral parts of the rim of the head L.

As the relation of the cam-recesses and the arm of the shaft B' requires careful adjustment to operate and time the movement of the valves properly, I provide for adjusting the position of the entire head or enlargement upon the end of the horizontal arm of the lever I as follows: The outer end of the horizontal arm is provided with laterally-projecting arms, as shown in Fig. 10, or is flared outwardly, as shown in Fig. 9, and the end of the arm is curved to form a seat for the head L, the curvature corresponding with that of the periphery of said seat. The head is secured to the end of the arm by means of bolts and nuts $t\ t$, passing through slots in the end of the arm, thus providing for a bodily adjustment of the head with relation to the arm, as well as for removing the head should occasion require. This bodily adjustment of the head may be used in connection with the adjustable cams or not, as preferred.

In Fig. 8 I show a construction of piston, which I have devised and which I prefer to use in the cylinders B B, though any other form of piston may be employed. Instead of having the head of the piston fit the interior wall of the cylinder, I make said head of a diameter somewhat less than that of the interior of the cylinder, so as to leave a space between the cylinder-wall and the periphery of the head, as shown at $i^2$ in Fig. 3. To the bottom of the head I secure a ring or disk $h$, of leather, rubber, or other flexible material, by means of an overlying plate $h^3$, secured by screws to the bottom of the head. The edges of this flexible ring or disk project beyond the periphery of the head and fill the space between the same and the walls of the cylinder, thus forming an elastic cushion, which is normally loose, but which is expanded by the pressure of the water on the working stroke of the piston and forms the tight joint necessary to the proper action of the device. The advantage of this arrangement is that on the return stroke of the piston, when the pressure of the water is relieved, the cushion loosens up and permits the piston to descend without preceptible friction, and also permits the passage of air past the piston-head into the lower part of the cylinder to prevent the formation of a vacuum when the exhaust occurs. It has, also, an advantage in point of economy of construction, for the reason that it is unnecessary to true-up the interior of the cylinder or the periphery of the head.

As an additional or alternative provision to prevent the formation of a vacuum under the piston when the exhaust takes place, I provide in the bottom of the piston-head an outwardly-opening flap-valve $h'$, covering an opening $h^2$. Normally this valve stands open;

but when water is let into the cylinder it closes the opening $h^2$, thus preventing the passage of the liquid above the piston.

The construction and operation of the engine being as above described, it will be noted that the flow of water from the supply into the valve-chamber E and through said chamber into the cylinders, alternately, is continuous and unbroken. In Fig. 7 the range of movement of the two-way valve is indicated, one extreme of its movement being shown in full lines and the other in dotted lines, from which it will be seen that the valve operates only in that part of its chamber farthest from the inlet-pipe $e'$, and that this inlet is a constantly-open one. It will also be seen that the peripheral area of the valve is such as to occupy just one-half of the interior of the chamber, so that when in position to let the water into one of the cylinders the inlet to the other cylinder is completely closed, but so that the openings to both cylinders cannot be closed at the same time in any position of the valve.

So far as I am aware, in all previous attempts to construct hydraulic engines of this character, there has been either a complete interruption in the flow of water into or from the valve-chamber, or such obstruction of said flow as to practically amount to an interruption, thereby necessitating the employment of large air-chambers, in connection with the inlet-pipes, to ease or cushion the shock due to the sudden stoppage of the flow. In small motors where the head of water is not great these shocks and blows do not amount to much; but in engines like mine, adapted for the heavier kinds of work, where high-pressures are required, such shocks are so dangerous and destructive to the engine as to absolutely require the use of extraneous devices to reduce the continual hammering and jarring, and even when such devices are resorted to it is only possible to measurably remove the difficulty.

A characteristic feature of my invention is that there is no interruption or obstruction to the flow of water through the valve-chambers into the cylinders, and consequently no shocks or hammering in the apparatus. The two-way valve simply acts to divert or change the direction of the flowing current from one cylinder to the other without at any time closing the openings leading to both cylinders, or the inlet-openings into the valve-chamber, and without obstructing said flow by reducing the capacity of the chamber.

As before stated, I do not desire or intend to be limited to the details of construction of the several parts included in my engine, as many modifications of the same may be made without departing from the spirit or scope of the invention. For example, the construction of the inlet and exhaust valves may be modified to suit the requirements of any particular use. The sliding connecting-rod of the valve mechanism may be otherwise connected to the stems of the exhaust and two-way valves, and the valve-operating lever may be one of a different order, and may be differently located and connected to the sliding rod in any other manner.

Having thus described my invention, what I claim, and desire to secure by Letters Patent, is—

1. The combination of a pair of cylinders having suitable inlets and exhausts at one end, a valve chamber common to said cylinders and communicating with the cylinder inlets, and suitable valves for controlling the inlet of water to the cylinders and the exhaust therefrom, the former being located in the valve chamber and being constructed, arranged and operated to admit water to the cylinders alternately without closing the inlet to the chamber and without interrupting the flow; substantially as described.

2. The combination of a pair of cylinders having suitable inlets and exhausts at one end, a valve chamber common to said cylinders, said chamber having a constantly open inlet, a two-way valve in the chamber for diverting the flow of water through said chamber into the cylinders alternately, and mechanism for operating said two-way valve so that the openings to the cylinders will be closed alternately, but not together, and without closing the inlet to the chamber; substantially as described.

3. The combination of a pair of cylinders having suitable inlets and exhausts at one end, a circular valve-chamber common to said cylinders and communicating with the cylinder inlets at opposite sides, a constantly open supply inlet for the valve chamber located at a point intermediate the cylinder inlets, a balanced, oscillating, two-way valve working in said chamber, and mechanism for operating the valve so that the openings to the cylinders will be closed alternately, but not together, and without closing the inlet to the chamber; substantially as described.

4. The combination of a pair of cylinders having independent inlets and exhausts at one end, a valve chamber common to the cylinders, said chamber having a constantly open inlet valve, and separate openings leading to the cylinders, a two-way valve in said chamber, said valve being constructed and arranged to move in its chamber so as to close the openings communicating with the cylinders alternately, but not both of said openings together, without at any time closing the chamber inlet, and mechanism for operating said two-way and exhaust valves so that the exhaust of each cylinder is closed as the two-way valve is operated to turn the water into the cylinder; substantially as described.

5. In a motor having a revolving shaft, the combination of a cylinder provided with a suitable inlet and exhaust at one end, valves for controlling the inlet and exhaust to and from said cylinder, and mechanism for operating the valves, said valve-operating mechanism comprising an oscillating lever having oppositely disposed cam recesses at its free end in which recesses works a crank on a revolving shaft of the motor; substantially as described.

6. In a motor having a revolving shaft, the combination of a pair of cylinders having suitable inlets at one end, a valve chamber common to said cylinders, a two-way valve in said chamber controlling the delivery of water therefrom alternately to said cylinders, exhausts leading from the cylinders, valves controlling the exhausts, and mechanism for operating all of said valves, said valve-operating mechanism comprising an oscillating lever having reversely curved recesses at its free end in which recesses works a crank on the revolving shaft; substantially as described.

7. In a motor having a revolving shaft, the combination of a pair of cylinders, a valve chamber common to said cylinders, a two-way valve in the chamber controlling the delivery of water therefrom alternately to said cylinders, exhausts leading from the cylinder, valves controlling said exhausts, a sliding bar connecting all of said valves for simultaneous operation, an oscillating lever connected with said bar, said lever having at its free end reversely curved cam recesses in which works a crank on the revolving shaft; substantially as described.

8. In a motor, the combination of the main shaft, having a crank and an oscillating lever, said lever having an enlargement at its free end provided with two oval communicating recesses, in one of which recesses the crank works on one-half of the stroke, and in the other of which it works on the other half of the stroke, each of said recesses having a cam surface near its junction with the other recess; substantially as described.

9. In a motor having a revolving shaft, the combination of an oscillating lever, a detachable and adjustable enlargement at the outer end of said lever, two oval communicating recesses in said enlargement in which a crank on the shaft is adapted to work, an adjustable cam surface in each of said recesses near its junction with the other, and means for adjusting the position of the enlargement on the end of the lever; substantially as described.

In testimony whereof I affix my signature in presence of two witnesses.

FRED STARR.

Witnesses:
D. W. WOOD,
JAMES WOOD.